United States Patent
Gill

(10) Patent No.: US 7,405,909 B2
(45) Date of Patent: Jul. 29, 2008

(54) CURRENT PERPENDICULAR TO PLANE (CPP) MAGNETORESISTIVE SENSOR WITH FREE LAYER BIASING BY EXCHANGE PINNING AT BACK EDGE

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 329 days.

(21) Appl. No.: 11/376,065

(22) Filed: Mar. 14, 2006

(65) Prior Publication Data

US 2007/0217085 A1    Sep. 20, 2007

(51) Int. Cl.
G11B 5/39    (2006.01)

(52) U.S. Cl. .............................. 360/324.12; 360/324.2

(58) Field of Classification Search .............. 360/324.1, 360/324.11, 324.12, 324.2
See application file for complete search history.

(56) References Cited

U.S. PATENT DOCUMENTS

| | | | |
|---|---|---|---|
| 5,576,914 A | 11/1996 | Rottmayer et al. .......... 360/113 |
| 6,005,753 A | 12/1999 | Fontana, Jr. et al. ......... 360/113 |
| 6,466,419 B1 | 10/2002 | Mao ....................... 360/324.12 |
| 6,469,879 B1 | 10/2002 | Redon et al. ............. 360/324.2 |
| 6,624,988 B2 * | 9/2003 | Gill ........................... 360/324.2 |
| 6,657,825 B2 | 12/2003 | Ho et al. ....................... 360/321 |
| 6,667,862 B2 | 12/2003 | Zhu ....................... 360/324.12 |
| 6,671,136 B2 | 12/2003 | Arai et al. .................... 360/321 |
| 6,671,141 B2 | 12/2003 | Shimazawa et al. ....... 360/324.2 |
| 6,704,175 B2 | 3/2004 | Li et al. .................. 360/324.11 |
| 6,754,056 B2 | 6/2004 | Ho et al. ................... 360/324.2 |
| 6,943,997 B2 | 9/2005 | Gill ........................ 360/324.12 |
| 6,952,328 B2 | 10/2005 | Hasegawa .............. 360/234.12 |
| 2002/0131215 A1 | 9/2002 | Beach ...................... 360/324.2 |
| 2003/0011946 A1 | 1/2003 | Gill ........................... 360/324.2 |
| 2004/0012899 A1 | 1/2004 | Hasegawa et al. ....... 360/324.12 |
| 2004/0061979 A1 | 4/2004 | Ho et al. ....................... 360/321 |
| 2004/0090716 A1 | 5/2004 | Jayasekara ............... 360/324.2 |
| 2004/0207959 A1 * | 10/2004 | Saito ........................ 360/324.1 |
| 2004/0207963 A1 | 10/2004 | Gill ........................ 360/324.12 |
| 2005/0073777 A1 | 4/2005 | Hasegawa et al. ........... 360/321 |
| 2005/0128653 A1 | 6/2005 | Gill ......................... 360/324.11 |
| 2005/0243474 A1 * | 11/2005 | Gill ........................... 360/324.1 |
| 2007/0019340 A1 * | 1/2007 | Gill ......................... 360/324.11 |

FOREIGN PATENT DOCUMENTS

JP    2002270920    9/2002

* cited by examiner

Primary Examiner—Jefferson Evans
(74) Attorney, Agent, or Firm—Zilka-Kotab, PC

(57) ABSTRACT

A current perpendicular to plane (CPP) magnetoresistive sensor having an in-stack bias structure that is pinned by an AFM layer located behind the back edge (stripe height) of the sensor stack. A magnetic coupling layer is exchange coupled to the in-stack bias structure and extends beyond the back edge of the sensor stack where it is pinned by the AFM layer. The magnetic coupling layer may be either directly exchange coupled with the AFM layer or exchange coupled with an intermediate magnetic layer that is itself exchange coupled with the AFM layer. The AFM layer is located entirely beyond the stripe height of the sensor stack and between top and bottom elevations as defined by the top and bottom of the sensor stack. In this way, the AFM can pin the biasing structure without consuming any gap budget.

29 Claims, 9 Drawing Sheets

CURRENT PERPENDICULAR TO PLANE (CPP) MAGNETORESISTIVE SENSOR WITH FREE LAYER BIASING BY EXCHANGE PINNING AT BACK EDGE

FIELD OF THE INVENTION

The present invention relates to magnetoresistive sensors and more particularly to a current perpendicular to plane giant magnetoresistive sensor (CPP GMR) having an in stack bias structure that is pinned by an AFM layer located behind the sensor stack.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

In the case of current-in-plane (CIP) spin valve sensors, the sensor is located between first and second nonmagnetic electrically insulating read gap layers and the first and second read gap layers are located between ferromagnetic first and second shield layers. But, in the case of current-perpendicular-to-plane (CPP) spin valve sensors, the non-magnetic, electrically insulating gap layers are absent, electrical connection being made to the sensor through conductive layers located above and below the sensor in place of the former insulating gap layers. In a merged magnetic head, a single ferromagnetic layer functions as the second shield layer of the read head and as the first pole piece layer of the write head. In a piggyback head, the second shield layer and the first pole piece layer are separate layers.

The ever increasing demand for increased data rate and data capacity has lead a relentless push to develop magnetoresistive sensors having improved signal amplitude. Sensors that show promise in achieving higher signal amplitude are current perpendicular to plane (CPP) sensors. Such sensors conduct sense current from top to bottom, perpendicular to the planes of the sensor layers. Examples of CPP sensors include current perpendicular to plane giant magnetoresistive sensors (CPP GMR sensors), and tunnel valves. A CPP GMR sensor operates based on the spin dependent scattering of electrons through the sensor, similar to a more traditional CIP GMR sensor except that, as mentioned above, the sense current flows perpendicular to the plane of the layers. A tunnel valve sensor operates based on the spin dependent tunneling of electrons through a thin, non-magnetic, electrically insulating barrier layer.

As sensors become ever smaller, free layer stability becomes a serious issue. As the free layer becomes smaller, it becomes increasingly difficult to keep the magnetization of the free layer biased in a desired direction. In addition, traditional biasing schemes, such as having hard bias layers at either side of the sensor stack are less desirable due to the potential for shorting sense current across the bias layers, and the resulting need to insulate the bias layer from the sensor stack (which reduces the strength of the bias field available for biasing the free layer). An in stack bias structure could be used to replace the traditional hard bias layers, however, such in stack bias structures consume a large amount of gap budget. In stack bias structures (especially the AFM layers used in such structures) are extremely thick and result in a greatly increased gap distance, which is unacceptable in current and future generation read sensors.

Therefore, there is a need for a CPP magnetoresitive sensor design that provides strong pinning, while maintaining a small gap thickness. Such a design would preferably avoid the use of hard bias layers disposed at lateral sides of the sensor. Such a design would also preferably minimize parasitic resistance that would otherwise degrade sensor performance.

SUMMARY OF THE INVENTION

The present invention provides a current perpendicular to plane giant magnetoresistive sensor (CPP GMR) having a sensor stack that includes a free layer and an in stack bias structure formed adjacent to the free layer. The in stack bias structure is exchange coupled with a magnetic coupling layer that extends beyond the back edge of the sensor stack, where it is pinned by a layer of antiferromagnetic material AFM layer. Pinning of the magnetic coupling layer by the AFM layer in turn pins the magnetization of the bias structure.

The bias structure may be an AP coupled structure including first and second magnetic layers that are antiparallel coupled across an AP coupling layer. The first magnetic layer can be separated from the free layer by a non-magnetic decoupling layer such as Ta, and the second magnetic layer can be exchange coupled with the magnetic coupling layer. The first and second magnetic layers of the bias structure could be a material such a NiFe. Alternatively, the in stack bias structure could be constructed as a single layer. In addition, the hard bias structure could be constructed of one or more layers of CoFeBSi.

The magnetic coupling layer can be directly exchange coupled to the AFM layer, or can be exchange coupled to an intermediate magnetic layer that is itself exchange coupled with the AFM layer. A layer of non-magnetic material such as Ta can be formed over the magnetic coupling layer and a lead/shield formed over the non-magnetic layer.

Placing the AFM layer behind the sensor stack greatly reduces the gap thickness while strongly pinning the bias layer in a desired direction parallel with the ABS. In fact a design according to the present invention saves about 150 Angstroms in gap thickness.

Placing the AFM layer behind the sensor also advantageously reduces the parasitic resistance that would be experienced if the AFM layer were located in the stack (ie. above the free layer and bias structure).

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
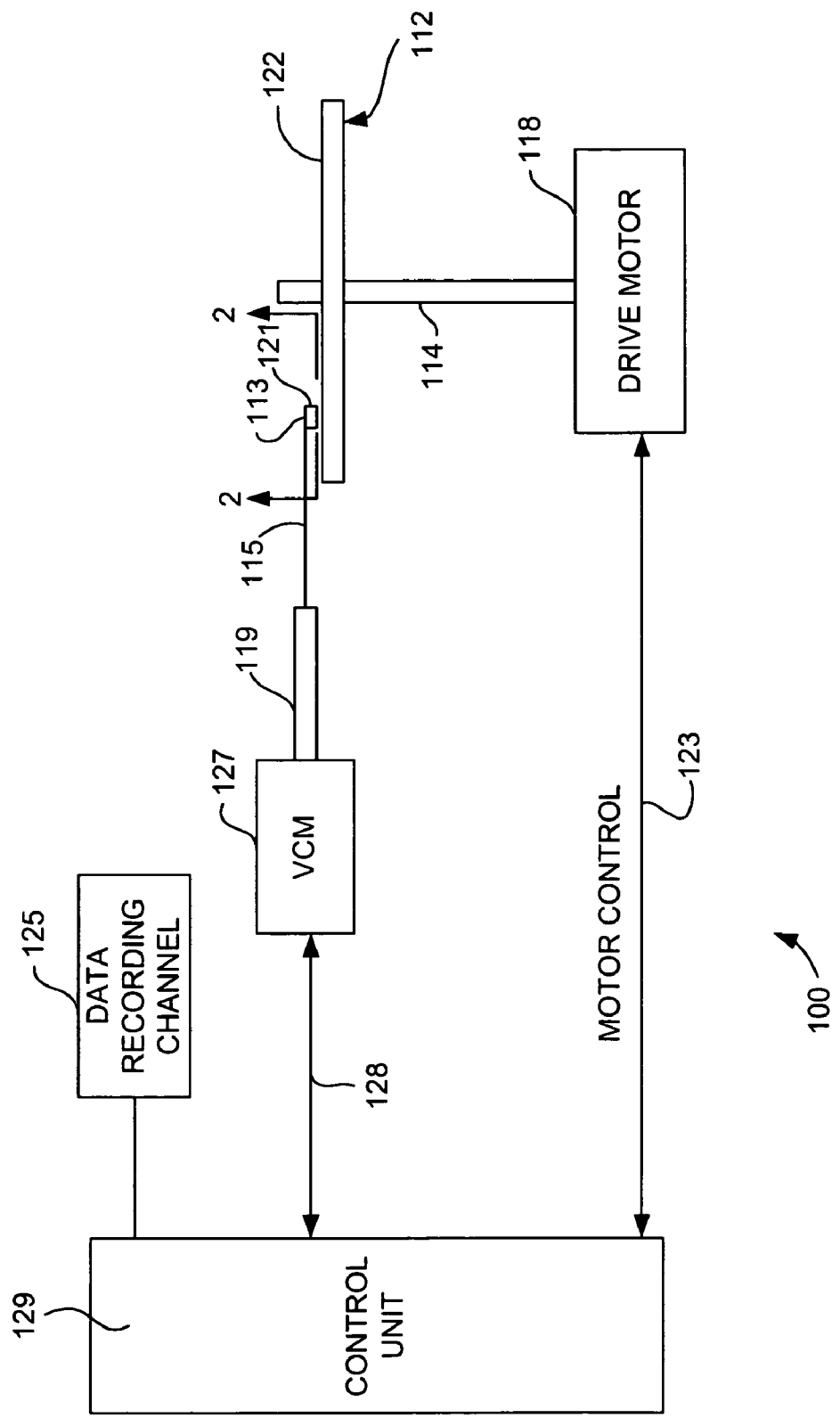
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
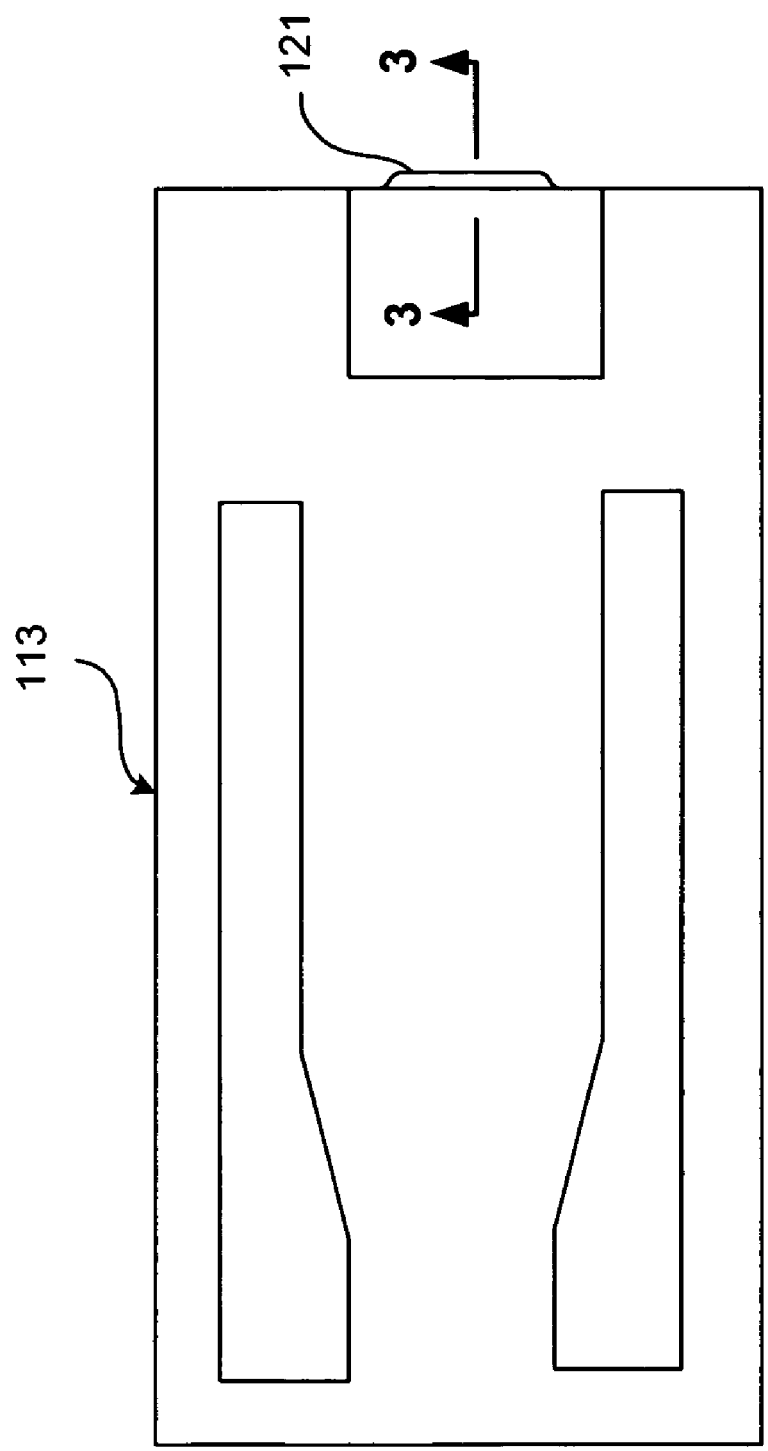
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
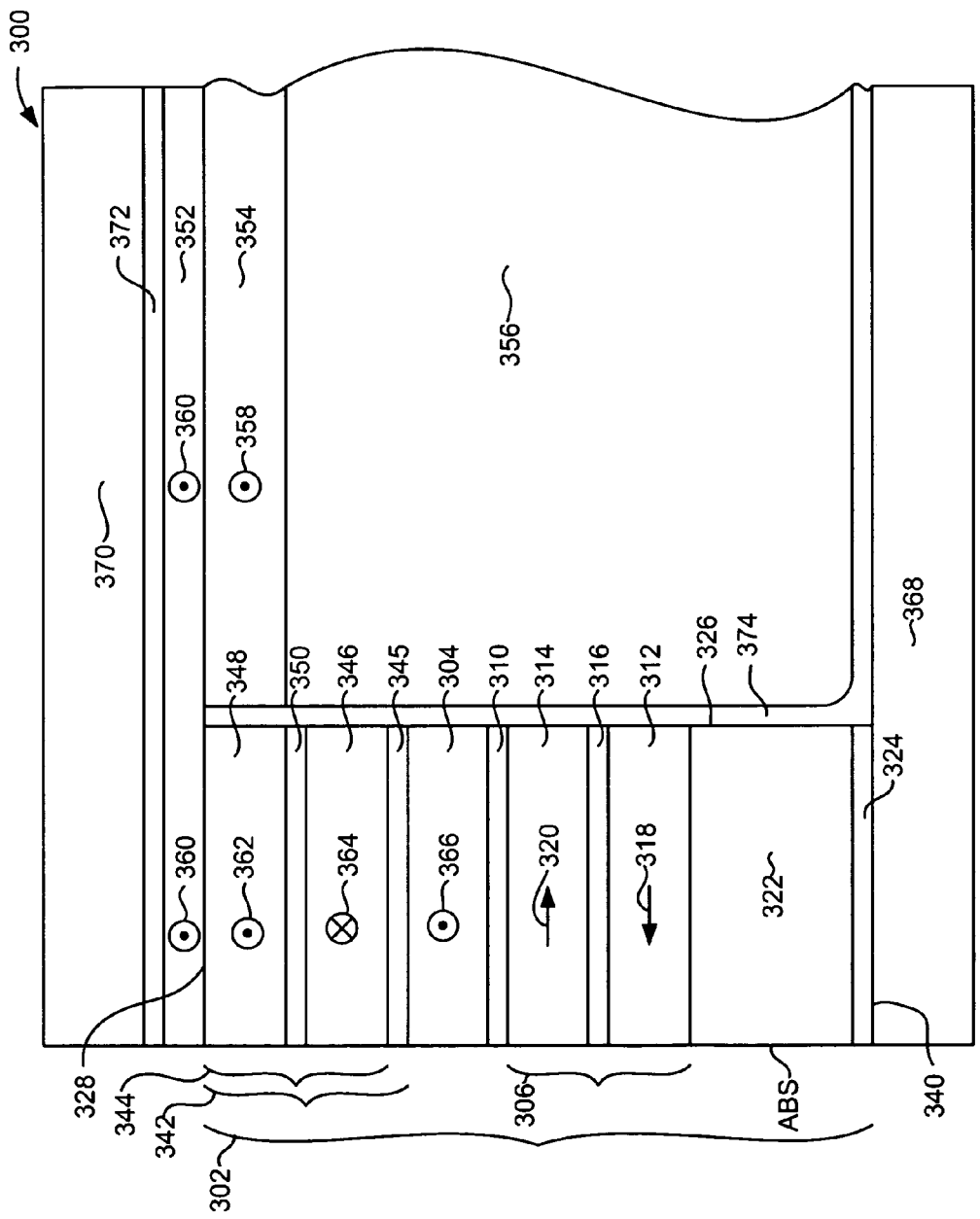
FIG. 3 is an enlarged cross sectional view taken from line 3-3 of FIG. 2.

With reference now to FIG. 3, a cross sectional view of a CPP giant magnetoresistive sensor (CPP GMR) 300 according to an embodiment of the invention is described. The sensor 300 includes a sensor stack 302 that includes a free layer structure 304, a pinned layer structure 306 and a non-magnetic spacer or barrier layer 310 sandwiched between the free layer 304 and pinned layer 306. It should be pointed out, that although the invention will be described herein below as a GMR sensor having a non-magnetic, electrically conductive spacer layer 310 such as Cu, the invention could also be embodied in a tunnel valve, in which case the layer 310 would be a thin, non-magnetic, electrically insulating barrier layer such as MgO.

The pinned layer 306 can be of several types, such as simple pinned, self pinned etc., but is preferably an AP coupled AFM pinned structure, and will be described accordingly. Therefore, the pinned layer 306 includes a first magnetic layer AP1 312, a second magnetic layer AP2 314, and a non-magnetic coupling layer such as Ru 316 sandwiched between the AP1 and AP2 layers. The coupling layer 316 is constructed to such a thickness (such as about 4 Angstroms) that it strongly antiparallel couples the magnetizations 318, 320 of the AP1 layer 312 and the AP2 layer 314, respectively, in desired directions that are perpendicular to the ABS and antiparallel to one another. The AP1 and AP2 layers 318, 320 can be constructed of, for example CoFe or some other magnetic material.

The AP1 layer 312 is exchange coupled with a layer of antiferromagnetic material ($1^{st}$ AFM layer) 322. The first AFM layer can be constructed of various antiferromagnetic materials such as PtMn, IrMn, etc., but is preferably constructed of IrMn, which has the advantage of providing an effective exchange field at a smaller thickness than is possible using PtMn. The $1^{st}$ AFM layer 322 provides an exchange field which strongly pins the magnetization 318 of the AP1 layer 312 in a desired direction perpendicular to the ABS, and as mentioned above, the antiparallel coupling between the AP1 and Ap2 layers 312, 314 pins the magnetization 320 in a direction opposite to the magnetization 318.

The sensor stack 302 may also have a seed layer 324 such as Ru or Ta at its bottom to initiate a desired grain structure in the later deposited layers. The sensor stack 302 has an air bearing surface ABS, a back edge or stripe height edge 326 opposite the ABS. The sensor stack 302 also has a bottom surface 340 that defines a first elevation and a top surface 328 that defines a second elevation, the top and bottom surfaces 328, 340 extending from the ABS to the back edge 326.

With reference still to FIG. 3, the sensor stack 302 includes an in-stack bias structure 342. The in-stack bias structure 342 is located adjacent to the free layer 304 opposite the spacer/barrier 310. The in-stack bias structure 302 includes a magnetic biasing structure 344 and a non-magnetic decoupling layer 345 sandwiched between the biasing structure 344 and the free layer 304. The decoupling layer 345 can be constructed of, for example Ta and can have a thickness of 10 to 30 Angstroms or about 20 Angstroms. The bias structure 344 itself can be an AP coupled structure including a first magnetic bias layer B1 346, a second magnetic Bias layer B2 348 and a second AP coupling layer 350 sandwiched between the B1 and B2 layers 346, 348 (the first coupling layer 316 is that which is part of the pinned layer structure 306). The second AP coupling layer 350 can be constructed of Ru having a thickness of 2-8 Angstroms or about 4 Angstroms. The B1 and B2 layers 346, 348 can be constructed of, for example NiFe and may have 5-15 percent or about 10 percent Fe. The B1 346 layer can have a thickness of 35-45 Angstroms or about 40 Angstroms. The B2 layer 348 can have a thickness of 5-15 Angstroms or about 10 Angstroms.

Alternatively, the biasing structure 344 can be constructed of different materials and different thickness and may be constructed as a single layer structure. For example, the biasing structure 344 can be constructed of a single layer of NiFe having 5-15 percent Fe or about 10 percent Fe and can have a thickness of 35-45 Angstroms or about 40 Angstroms. The biasing structure 344 can also be constructed of a single layer or AP coupled layers of CoFeBSi, which has a desired negative magnetostriction.

With continued reference to FIG. 3, the sensor 300 includes a magnetic coupling layer or bias pinning layer 352. The magnetic coupling layer 352 can be constructed of a magnetic material such as NiFe or CoFe and may have a thickness of 5-20 Angstroms or about 10 Angstroms. The coupling layer 352 is exchange coupled with the bias structure 344, such as by exchange coupling with the B2 layer 348 through contact with the top surface 328 of the sensor stack 302. The coupling layer 352 may extend to the ABS and extends beyond the back edge or stripe height 326 of the sensor stack 302.

Beyond the back edge 326 of the sensor stack 302, the coupling layer can be exchange coupled with another magnetic layer (intermediate magnetic layer) 354. The intermediate magentic layer 354 is exchange coupled with a layer of antiferromagnetic material ($2^{nd}$ AFM layer) 356. The second AFM layer 356 can be constructed of various antiferromagnetic materials, such as PtMn, IrMn, etc. and is preferably constructed of a material that is different from that of the $1^{st}$ AFM layer 322 (and one which has a different blocking temperature) so that the two AFM layers 322, 356 can be annealed in perpendicular directions. Therefore, the second AFM layer 356 is preferably constructed of PtMn, while the first AFM layer 322 is preferably constructed of IrMn as mentioned above.

The $2^{nd}$ AFM layer 356 is exchange coupled with the intermediate exchange coupling layer 354, which can be constructed of a material such as CoFe, which exchange couples well with the material of the $2^{nd}$ AFM layer 356. The exchange coupling between the intermediate layer 354 and the second AFM layer 356 strongly pins the magnetization 358 of the intermediate layer 354 in a desired direction that is parallel with the ABS as shown. Exchange pinning between the intermediate layer 354 and the coupling layer 352 in turn pins the magnetization 360 of the coupling layer in the same direction as that 358 of the intermediate layer 354.

The coupling layer is also exchange coupled with the biasing structure 344 so that it pins the bias layer 344. For example, if the bias structure 344 is an AP coupled bias structure as shown, exchange coupling between the magnetic coupling layer 352 and the B2 layer 348 strongly pins the magnetization 362 of the B2 layer in a desired direction parallel the ABS in same direction as the magnetization 360 of the magnetic coupling layer 352. Antiparallel coupling between the B1 layer 346 and the B2 layer 348 strongly pins the magnetization 364 of the B1 layer 346.

Magnetostatic coupling between the B1 magnetic layer 346 and the free layer 304 across the decoupling layer 345 biases the magnetization 366 of the free layer 304 in a desired direction parallel with the ABS, while leaving the magnetization 366 of the free layer 304 able to rotate in the presence of a magnetic field such as from a magnetic medium (not shown in FIG. 3).

In an alternative embodiment of the invention, the intermediate layer 354 can be eliminated and the coupling layer 352 can be directly exchange coupled with (and in contact with) the second AFM layer 356. In this alternative embodiment, the coupling layer can be constructed of NiFe or can be constructed of CoFe to provide improved exchange coupling with the second AFM layer 356.

With continued reference to FIG. 3, first and second electrically conductive leads 368, 370 are provided at the top and bottom of the sensor 300. The leads 368, 370 provide a sense current to the sensor and may be constructed of a magnetic material such as NiFe in order to function as magnetic shields as well as electrically conductive leads. For this reason, the layers 368, 370 can be interchangeably referred to as either leads or shields. An electrically conductive, non-magnetic layer 372 constructed of, for example, Ta may be provided between the magnetic coupling layer 354 and the second lead/shield 370. An insulation layer 374 is provided, extending over the back edge 326 of the sensor stack 302 and over the first lead/shield 368 to prevent sense current from being shunted through second AFM layer 356. The insulation layer can be constructed of, for example alumina ($Al_2O_3$) and is preferably deposited by a conformal deposition method such as atomic layer deposition or chemical vapor deposition.

Figure 4:
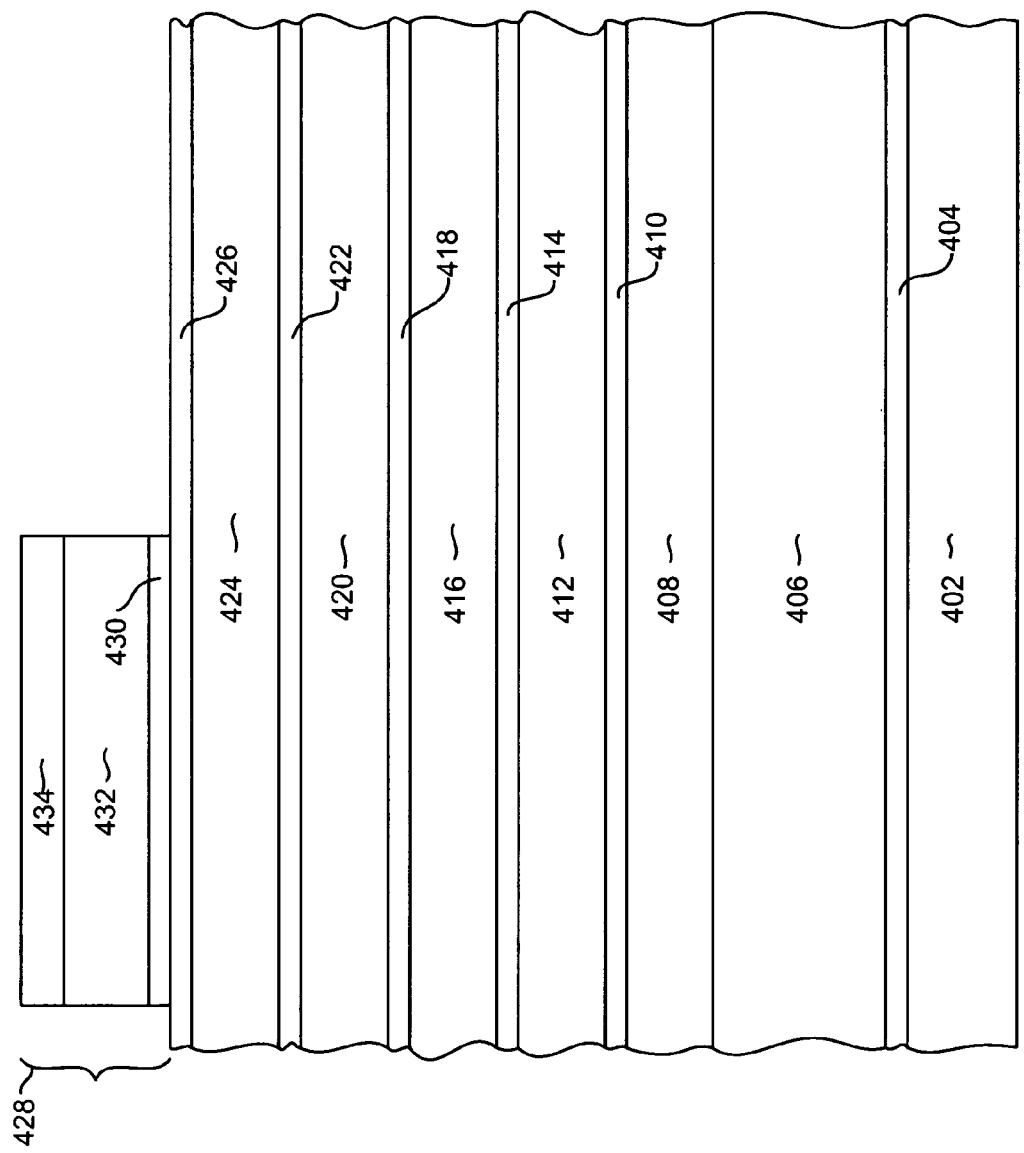
FIGS. 4-9 are cross sectional views of a magnetoresistive sensor in various intermediate stages of manufacture, illustrating a method of manufacturing a magnetoresistive sensor according to an embodiment of the invention.

With reference now to FIGS. 4-9 a method for constructing a magnetoresistive sensor according to an embodiment of the invention is described. With particular reference to FIG. 4, a plurality of sensor layers is deposited over a substrate such as a lead/shield 402. The sensor layers can include: a seed layer such a Ru or Ta 404; a first AFM layer such as IrMn 406; AP1 layer 408 constructed of a magnetic material such a CoFe; a first AP coupling layer 410 such as Ru; an AP2 layer 412 constructed of a magnetic material such as CoFe; a spacer layer 414 constructed of a non-magnetic, electrically conductive material such as Cu (or insulating barrier layer); a magnetic free layer 416 constructed of a material such as Co, CoFe, NiFe or a combination of these or other materials; a decoupling layer 418 such as Ta; a first magnetic bias layer B1 420 such as $NiFe_{10}$; a second AP coupling layer 422 such as Ru; a second magnetic bias layer B2 424 such as $NiFe_{10}$; and a protective or capping layer 426 such as Ta, diamond like carbon (DLC) or alumina ($Al_2O_3$).

A mask structure 428 is formed over the sensor layers. The mask structure may include a hard mask layer 430, such as alumina, DLC or silicon oxide $SiO_2$, etc, an image transfer layer 432 constructed of a non-photoreactive material such as a soluble polyimide such as DURIMIDE®, and a photomask layer 434 constructed of a photosensitive material such as photoresist. The mask 428 can be formed by depositing the layers 430, 432, 434, photolithographically patterning the photoresist layer and then transferring the image of the photomask 434 onto the underlying mask layers 432, 430, such as by using one or more reactive ion etch processes (RIE).

Figure 5:
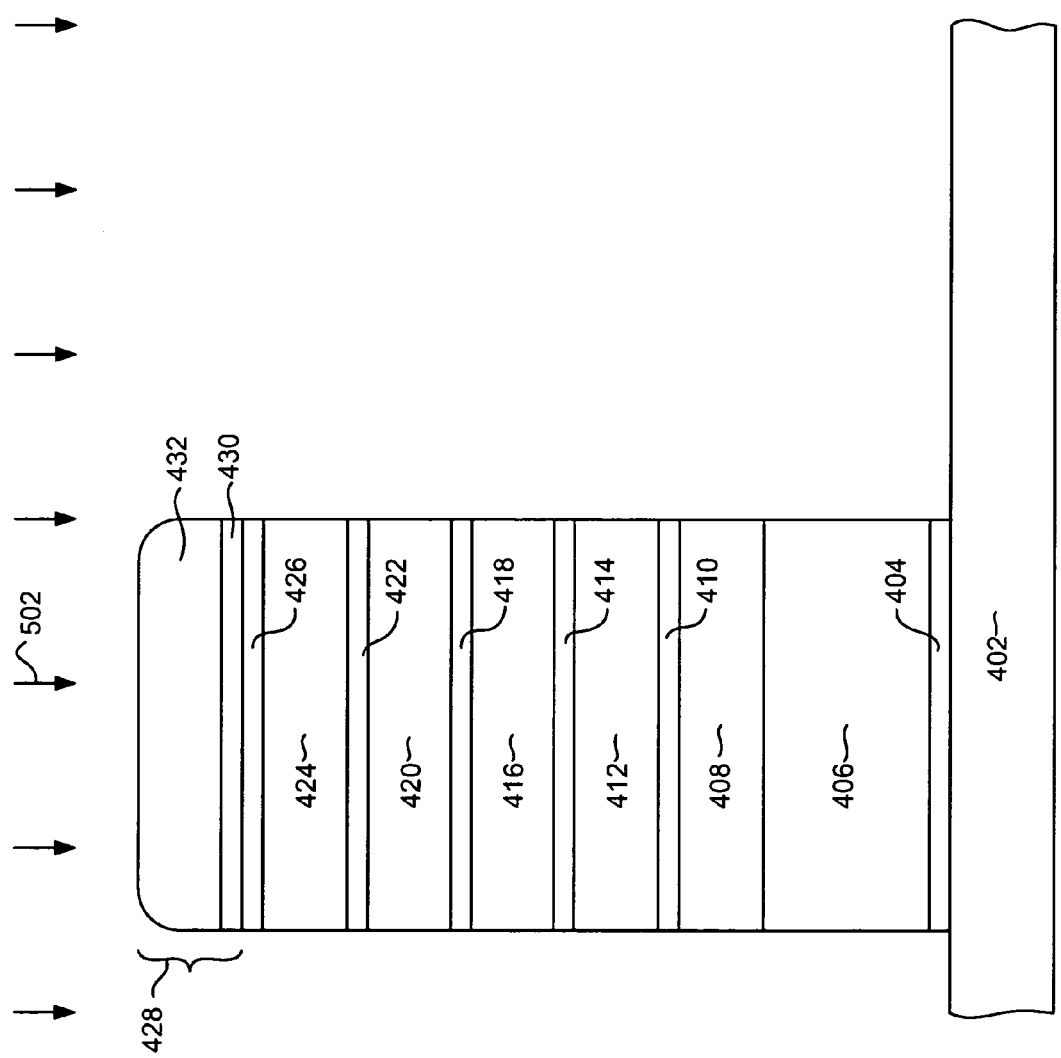

With reference now to FIG. 5, ion milling is performed by exposing the hard mask and sensor layers to an ion beam 502 to transfer the pattern of the mask structure 428 onto the underlying sensor layers 404-426. The photoresist layer 434, and all or a portion of the image transfer layer 432 will likely be consumed by the ion beam 502 during the ion milling.

Figure 6:
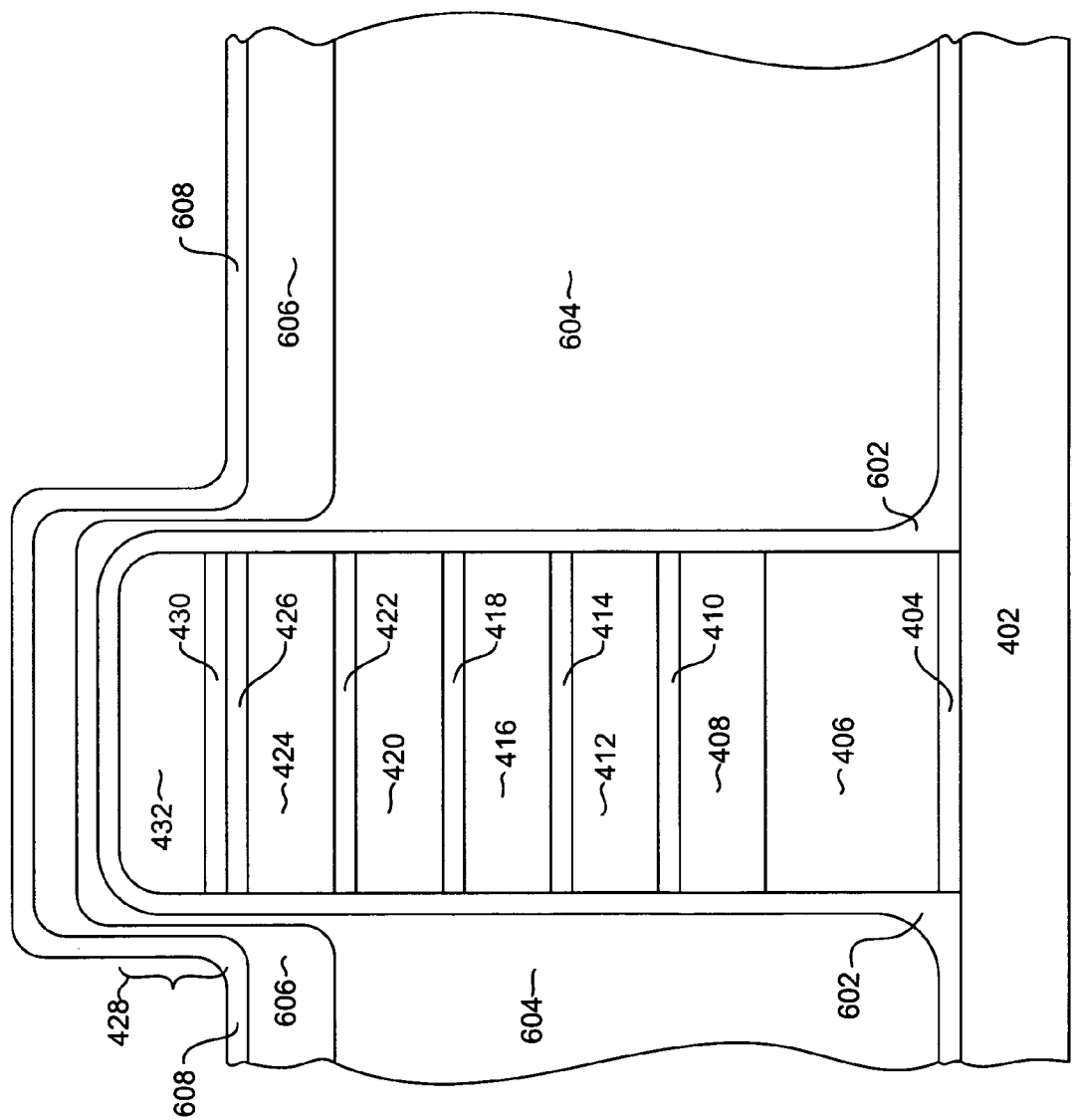

Then, with reference to FIG. 6, a thin layer of electrically insulating material 602 such as alumina ($Al_2O_3$) is deposited. The insulation layer 602 is preferably deposited by a conformal deposition method such as chemical vapor deposition, atomic layer deposition, etc. Then, a layer of antiferromagnetic material 604, preferably PtMn is deposited, followed by a layer of magnetic material 606 such as CoFe. It should be pointed out that the deposition of the magnetic material 606 at this point is optional, and if the intermediate layer 354 is to be omitted as described with reference to FIG. 3, then the layer 606 would not be needed at this point. A layer of material that is resistant to removal by chemical mechanical polishing (CMP stop layer) 608 is then deposited. The CMP stop 608 can be, for example diamond like carbon (DLC) or some other hard material.

Figure 7:
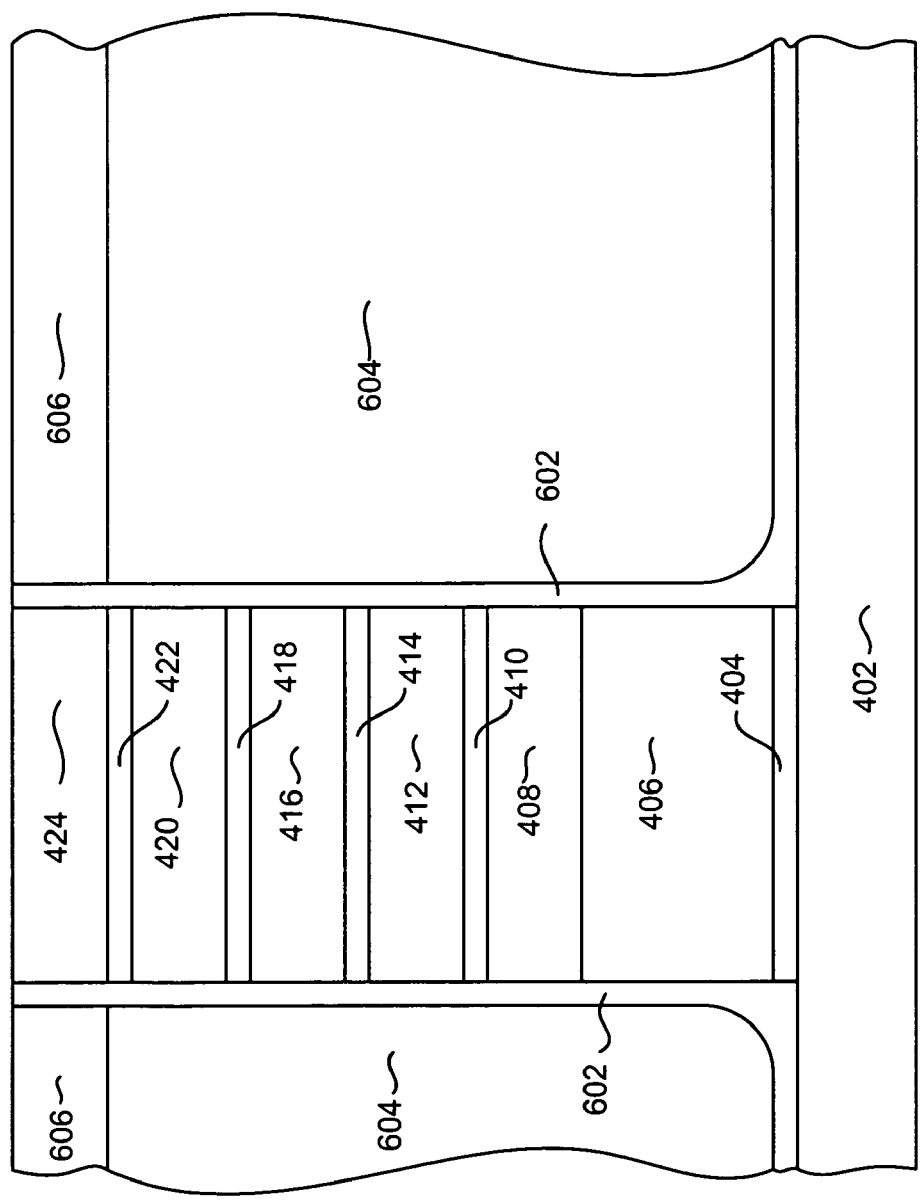
Figure 8:
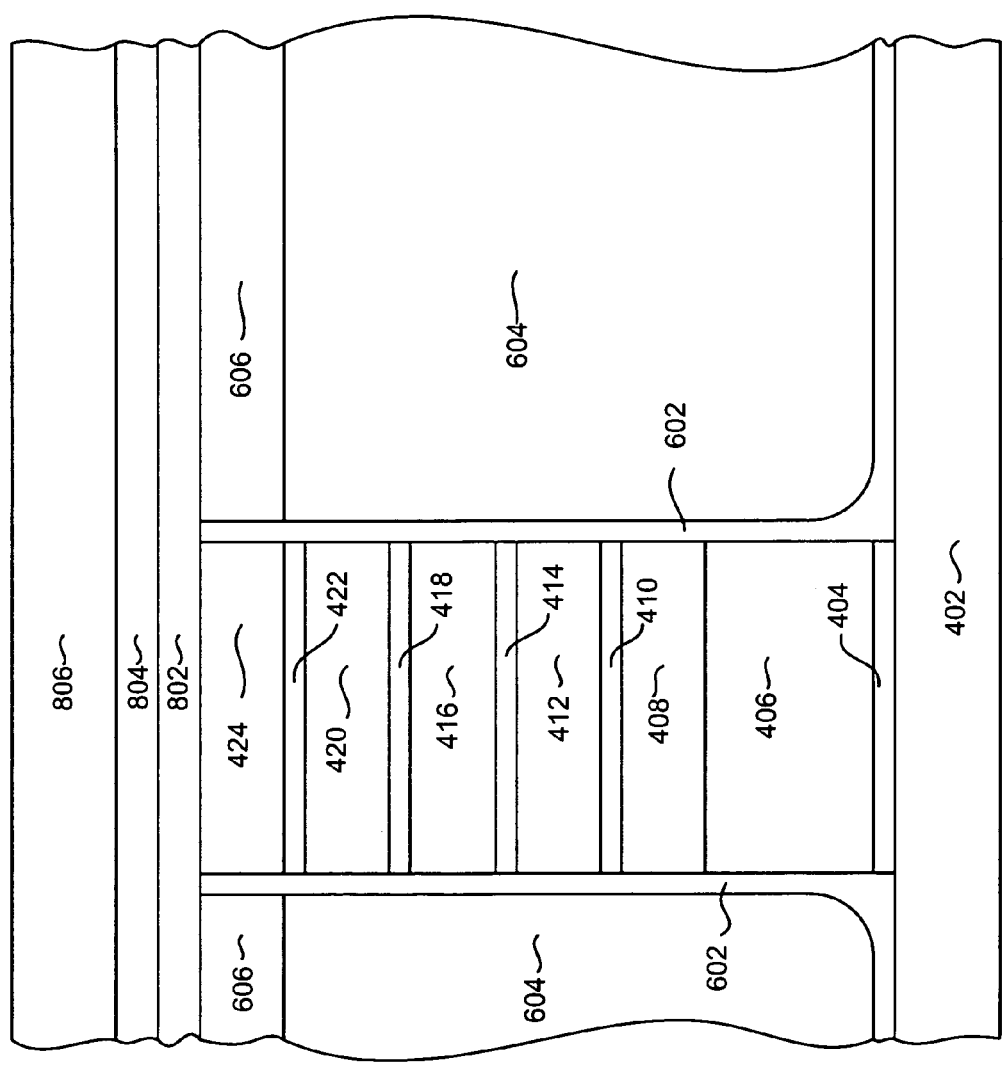
Figure 9:
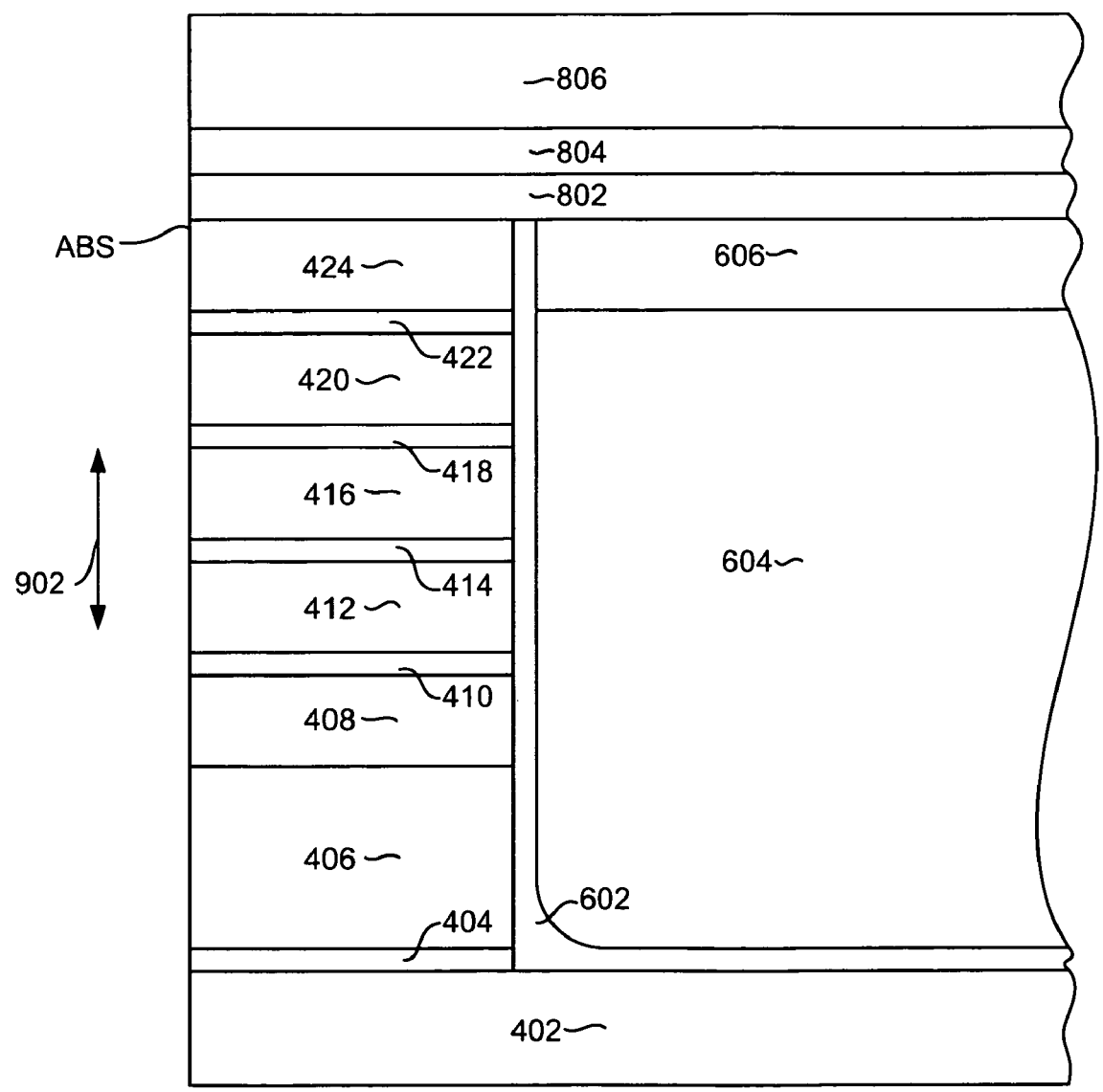

With reference now to FIG. 7, chemical mechanical polishing (CMP) is performed to remove the remaining mask layers 430, 432 (FIG. 5), and planarize the surface. A reactive ion etch (RIE) is then performed to remove the CMP stop layer 608 (FIG. 6) and to remove the cap layer 426, leaving the magnetic layer B2 424 exposed. With reference now to FIG. 8, a magnetic coupling layer 802, such as NiFe is deposited. A non-magnetic layer 804 such as Ta may then be deposited followed by lead/shield layer 806, which may be NiFe. With reference to FIG. 9 a lapping process 902 is performed to remove a desired amount of material to form the air bearing surface (ABS).

With reference again to FIG. 3, it can be seen that the AFM layer is located entirely beyond the back edge 326 of the sensor stack 302, and is contained entirely between the elevations defined by the top and bottom surfaces 328, 340 of the sensor stack 302. In this way, the AFM does not consume any gap budget. As those skilled in the art will appreciate, AFM layers must be very thick in order to provide an effective exchange field for pinning. For example, the PtMn AFM layer 356 would have to be about 150 Angstroms thick to provide effective pinning. Therefore, moving the AFM layer 356 behind the sensor stack rather than above it results in a very large reduction in gap thickness.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A current perpendicular to plane magnetoresistive sensor, comprising:
    a sensor stack having an air bearing surface ABS, a back edge opposite the ABS and top and bottom surfaces each extending from the ABS to the to the back edge, the sensor stack further comprising:
    a magnetic free-layer structure; and
    an in stack-bias structure disposed adjacent to the free-layer structure opposite the spacer layer;
    a magnetic coupling layer contacting and exchange coupled to the bias structure, the magnetic coupling layer extending from the ABS to beyond the back edge of the sensor stack;
    a layer of antiferromagnetic material (AFM layer) disposed beyond the back edge of the sensor stack, the AFM layer being exchange coupled with the magnetic coupling layer in a region beyond the back edge of the sensor stack.

2. A sensor as in claim 1, wherein the exchange coupling between the AFM layer and the magnetic coupling layer pins the magnetization of the magnetic coupling layer in a direction parallel with the ABS.

3. A sensor as in claim 1 wherein the bias structure comprises first and second magnetic layers (B1 and B2, respectively), a non-magnetic antiparallel coupling layer disposed between B1 and B2 and a non-magnetic decoupling layer sandwiched between the first magnetic layer and the free layer.

4. A sensor as in claim 1 wherein the bias structure comprises a layer of Ta formed over and in contact with the free layer, a first magnetic layer (B1 layer) formed over the layer of Ta, a layer of Ru formed over the B1 layer and a second magnetic layer (B2 layer) formed over the Ru layer, the B2 layer being exchange coupled with the magnetic coupling layer that extends from the ABS to beyond the back edge of the sensor stack.

5. A sensor as in claim 1 wherein the bias structure comprises a layer of Ta formed over and in contact with the free layer, a first layer of NiFe (B1 layer) formed over the layer of Ta, a layer of Ru formed over the B1 layer and a second layer of NiFe (B2 layer) formed over the Ru layer, the B2 layer being exchange coupled with the magnetic coupling layer that extends from the ABS to beyond the back edge of the sensor stack.

6. A sensor as in claim 1 further comprising a layer of electrically insulating material disposed between the AFM layer and the back edge of the sensor stack.

7. A sensor as in claim 1 wherein the magnetic coupling layer comprises NiFe.

8. A sensor as in claim 1 wherein the magnetic coupling layer comprises NiFe and has a thickness of 5-15 Angstroms.

9. A sensor as in claim 1 wherein the magnetic coupling layer comprises NiFe and has a thickness of about 10 Angstroms.

10. A sensor as in claim 1 wherein the magnetic coupling layer comprises CoFe.

11. A sensor as in claim 1 wherein the AFM layer comprises PtMn.

12. A sensor as in claim 1 wherein the AFM layer comprises IrMn.

13. A sensor as in claim 1 wherein the sensor stack further comprises a pinned-layer structure and a non-magnetic, electrically conductive spacer layer sandwiched between the free layer structure and the pinned layer structure.

14. A sensor as in claim 13 wherein the spacer layer comprises Cu.

15. A sensor as in claim 1 wherein the sensor stack further comprises a pinned-layer structure and a non-magnetic, electrically insulating barrier layer sandwiched between the free-layer structure and the pinned-layer structure.

16. A sensor as in claim 1 wherein the barrier layer comprises MgO.

17. A sensor stack as in claim 1 wherein the bias structure includes a layer of Ta formed over the free layer and a layer of NiFe formed over the layer of Ta.

18. A sensor stack as in claim 1 wherein the bias structure includes a layer of Ta formed over the free layer and a layer of CoFeBSi formed over the layer of Ta.

19. A sensor stack as in claim 1 further comprising a first electrically conductive lead layer formed below the sensor stack, a second electrically conductive lead formed above the sensor stack and the magnetic coupling layer, a non-magnetic layer sandwiched between the second electrically conductive lead and the magnetic coupling layer.

20. A current perpendicular to plane magnetoresistive senor, comprising:
    a sensor stack including a magnetic free layer and an in-stack biasing structure, the sensor stack having an air bearing surface (ABS) a back edge opposite the ABS and top and bottom surfaces each extending from the ABS to the back edge;
    a magnetic coupling layer exchange coupled with the in-stack bias structure and extending from the ABS to beyond the back edge of the sensor stack;
    an intermediate magnetic layer exchange coupled with the magnetic coupling layer in a region beyond the back edge of the sensor stack; and
    a layer of antiferromagnetic material (AFM layer) located entirely beyond the back edge of the sensor stack, the layer being exchange coupled with the intermediate magnetic layer.

21. A sensor as in claim 20 wherein the intermediate magnetic layer comprises CoFe and the magnetic coupling layer comprises NiFe.

22. A sensor as in claim 20 wherein the intermediate magnetic layer comprises CoFe, the AFM layer comprises PtMn and the magnetic coupling layer comprises NiFe.

23. A sensor as in claim 20 wherein the intermediate magnetic layer comprises CoFe and has a thickness of 10-30 Angstroms, and the magnetic coupling layer comprises NiFe and has a thickness of of 5-15 Angstroms.

24. A sensor as in claim 20 wherein the bottom surface of the sensor stack defines a first elevation and the top surface of the sensor stack defines a second elevation, and wherein the AFM layer is disposed entirely between the first and second elevations.

25. A sensor as in claim 20 further comprising a layer of electrically insulating material separating the AFM layer and the intermediate magnetic layer from the back edge of the sensor stack.

26. A sensor as in claim 20 further comprising a non-magnetic layer contacting the magnetic coupling layer at a side opposite the sensor stack, and an electrically conductive lead formed over the non-magnetic layer.

27. A sensor as in claim 20 further comprising a layer of Ta formed over the magnetic coupling layer, and a layer of NiFe formed over the layer of Ta.

28. A sensor as in claim 20 wherein the in stack bias structure further comprises:
    first and second magnetic layers separated by an antiparallel coupling layer; and
    a non-magnetic decoupling layer sandwiched between the first magnetic layer and the free layer; and wherein the second magnetic layer is exchange coupled with the magnetic coupling layer.

29. A magnetoresistive sensor as in claim 20 wherein the in stack bias structure further comprises:
    a first layer of NiFe;
    a layer of Ta sandwiched between the first layer of NiFe and the free layer;
    a second layer of NiFe; and
    a layer of Ru sandwiched between the first and second layers of NiFe; and
    wherein
    the second layer of NiFe is exchange coupled with the magnetic coupling layer.

* * * * *